(12) United States Patent
Lai (10) Patent No.: US 8,108,470 B2
(45) Date of Patent: Jan. 31, 2012

(54) MESSAGE MANAGEMENT SYSTEM AND METHOD

(75) Inventor: Mu-Hsuan Lai, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1327 days.

(21) Appl. No.: 10/896,683

(22) Filed: Jul. 22, 2004

(65) Prior Publication Data

US 2006/0020666 A1    Jan. 26, 2006

(51) Int. Cl.
*G06F 15/16* (2006.01)
*G06F 19/00* (2011.01)
(52) U.S. Cl. ............ 709/206; 700/103; 700/121
(58) Field of Classification Search ............ 709/206
See application file for complete search history.

(56) References Cited

U.S. PATENT DOCUMENTS

| | | | |
|---|---|---|---|
| 5,937,161 A * | 8/1999 | Mulligan et al. | 709/206 |
| 5,993,041 A * | 11/1999 | Toba | 700/99 |
| 6,292,825 B1 * | 9/2001 | Chang et al. | 709/206 |
| 6,604,012 B1 * | 8/2003 | Cho et al. | 700/121 |
| 6,678,572 B1 * | 1/2004 | Oh | 700/121 |
| 6,694,218 B2 * | 2/2004 | Oh | 700/217 |
| 6,697,458 B1 * | 2/2004 | Kunjibettu | 379/88.17 |
| 6,768,930 B2 * | 7/2004 | Oh | 700/217 |
| 6,779,022 B1 * | 8/2004 | Horstmann et al. | 709/206 |
| 6,788,996 B2 * | 9/2004 | Shimizu | 700/213 |
| 6,889,178 B1 * | 5/2005 | Chacon | 703/6 |
| 6,952,622 B2 * | 10/2005 | Babikian et al. | 700/100 |
| 6,975,914 B2 * | 12/2005 | DeRemer et al. | 700/96 |
| 6,975,962 B2 * | 12/2005 | Wegerich et al. | 702/182 |
| 7,069,101 B1 * | 6/2006 | Arackaparambil et al. | 700/121 |
| 7,233,886 B2 * | 6/2007 | Wegerich et al. | 703/2 |
| 7,426,419 B2 * | 9/2008 | Heskin et al. | 700/101 |
| 2003/0139176 A1 * | 7/2003 | Fujiwara et al. | 455/420 |
| 2004/0003071 A1 * | 1/2004 | Mathew et al. | 709/223 |
| 2004/0261016 A1 * | 12/2004 | Glass et al. | 715/512 |
| 2004/0267641 A1 * | 12/2004 | Chang et al. | 705/28 |
| 2005/0004992 A1 * | 1/2005 | Horstmann et al. | 709/206 |
| 2005/0044183 A1 * | 2/2005 | Meunier et al. | 709/219 |
| 2005/0060212 A1 * | 3/2005 | Annamaneni et al. | 705/7 |
| 2005/0177562 A1 * | 8/2005 | Raciborski | 707/3 |
| 2005/0187649 A1 * | 8/2005 | Funk et al. | 700/121 |
| 2005/0228881 A1 * | 10/2005 | Reasor et al. | 709/224 |
| 2006/0031352 A1 * | 2/2006 | Marston et al. | 709/206 |
| 2007/0111794 A1 * | 5/2007 | Hogan et al. | 463/42 |
| 2008/0201469 A1 * | 8/2008 | Reasor et al. | 709/224 |

* cited by examiner

*Primary Examiner* — Patrice Winder
*Assistant Examiner* — Tauqir Hussain
(74) *Attorney, Agent, or Firm* — Thomas|Kayden (57) ABSTRACT

A message management system and method is described. A message control unit includes a dispatch rule, a role table, and a dispatch engine. The dispatch rule defines system identification, message type, and corresponding client identification and mail role. The role table defines client identification, mail role, and corresponding message recipient. The dispatch engine receives a plurality of messages from a plurality of systems, and transmits the messages to corresponding recipients according to the dispatch rule, the role table, and content.

14 Claims, 7 Drawing Sheets

| SysID | MsgType | ClientID | MailRole |
|---|---|---|---|
| PCInfo | WaferStartReport | U811 | R&D |
| PCInfo | WaferStartReport | U811 | Product |

FIG. 7

| ClientID | MailRole | MsgRecipient |
|---|---|---|
| U811 | R&D | Recipient A |
| U811 | R&D | Recipient B |
| U811 | Product | Recipient C |

FIG. 8

[ PCInfo, U811, TMH699A, WaferStartReport ]

XXXX lots have been released to waferstart

FIG. 9

MESSAGE MANAGEMENT SYSTEM AND METHOD

BACKGROUND

The invention relates to message management, and particularly to a message management system and method that integrates multiple message systems, and provides centralized message management and dispatch.

In a supplier, such as a semiconductor manufacturer, multiple alarm and information systems are employed to monitor system status or/and production lines. These systems are configured according to client requirements, so that the clients can receive necessary notification, such as wafer start, outgoing, yield information, and others by email or other methods. However, since not all systems can offer complete event management and notification functions, clients receive inconsistent notification, with correspondingly limited information.

Figure 1:
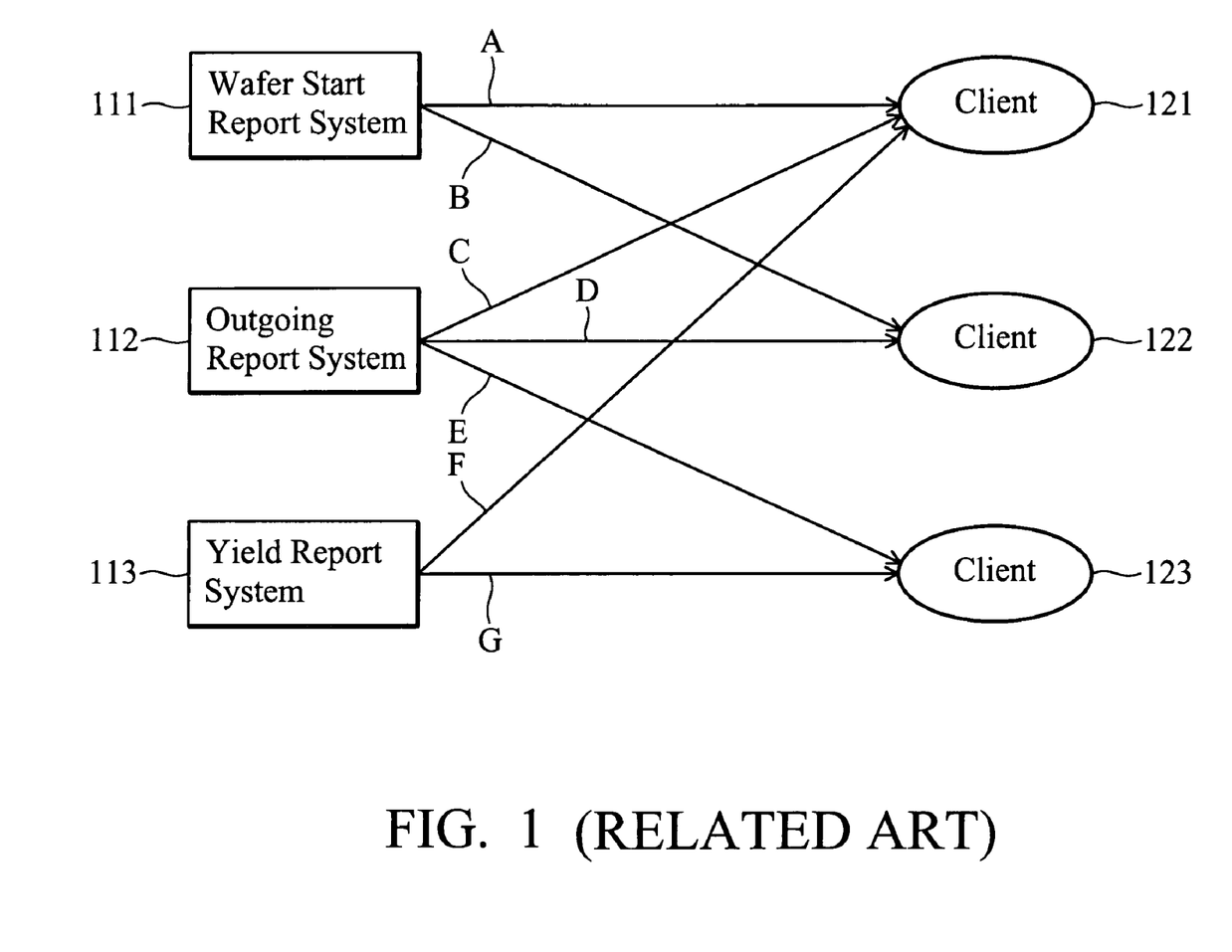
FIG. 1 is a schematic diagram illustrating conventional message notification.

FIG. 1 is a schematic diagram illustrating a conventional message notification system. Conventionally, each system maintains individual recipient lists, forwarding email messages to corresponding clients accordingly. In this case, wafer start (111), outgoing (112) and yield (113) report systems transmit messages to clients (121, 122 and 123) via channels A~G. Since the recipient lists of each system are maintained manually, respective clients may receive inaccurate information if recipient lists are maintained erroneously, thereby violating confidentiality.

From a client perspective, since different departments of respective clients may have different message needs for analysis, and the required message types may be frequently changed, there is no efficient manner in which to manage a large amount of messages from the supplier. Further, if one recipient is absent, replacement personnel are unable to locate and retrieve related messages.

From a supplier perspective, report systems are difficult to enhance and integrate if in packages or they are developed by different suppliers. Further, without an appropriate integration mechanism, duplicate labor is required to implement complete notification in all systems. Furthermore, since recipients for respective clients may also change frequently, the supplier has difficulty maintaining recipient lists in respective systems, thereby wasting related resources including manpower and time.

SUMMARY

An embodiment of the invention is thus proposed to address the aforementioned issues. It is noted that this embodiment, among others, is applicable to any factory, service supplier, and/or product.

The invention provides a message management system and method. According to an embodiment of the invention, the system includes a message control unit. The message control unit includes a dispatch rule, a role table, and a dispatch engine. The dispatch rule defines system identification, message type, and corresponding client identification and mail role. The role table defines client identification, mail role, and corresponding message recipient. The dispatch engine receives a plurality of messages from a plurality of systems, and transmits the messages to corresponding message recipients according to the dispatch rule, the role table, and message content of respective message.

The system further includes a parsing engine to parse respective messages to obtain message content. The message content includes at least system identification, message type and client identification.

The message control unit further classifies and stores respective messages to a message database according to message content. The message control unit further provides a user interface enabling query of messages according to client identification and mail role, with the query result shown and browsable in a web-based user interface.

The message control unit further includes at least one filter mask, with the dispatch engine further filtering messages using the filter mask and delivering messages if the message complies with filter mask limitations.

According to this embodiment of the invention, a message management method is also provided. First, a plurality of messages is received from a plurality of systems. Then, the messages are transmitted to corresponding message recipients according to a dispatch rule, a role table, and message content of the respective messages. The dispatch rule defines system identification, message type, and corresponding client identification and mail role, and the role table defines client identification, mail role, and corresponding message recipient.

Messages are further parsed to obtain message content. The message content includes at least system identification, message type and client identification.

Respective messages are further classified and stored to a message database according to content. The messages are further queried according to corresponding client identification and mail role of recipient via a user interface, with the query result viewable and browsable in a web-based user interface.

The messages are further filtered using at least one filter mask per message recipient, with the messages transmitted to the message recipient if the messages comply with the filter mask.

The above-mentioned method may take the form of program code embodied in a tangible media. When the program code is loaded into and executed by a machine, the machine can become an apparatus for practicing the disclosed methods.

BRIEF DESCRIPTION OF THE DRAWINGS

The aforementioned features and advantages will become apparent by referring to the following detailed description with reference to the accompanying drawings, wherein.

DESCRIPTION

Figure 2:
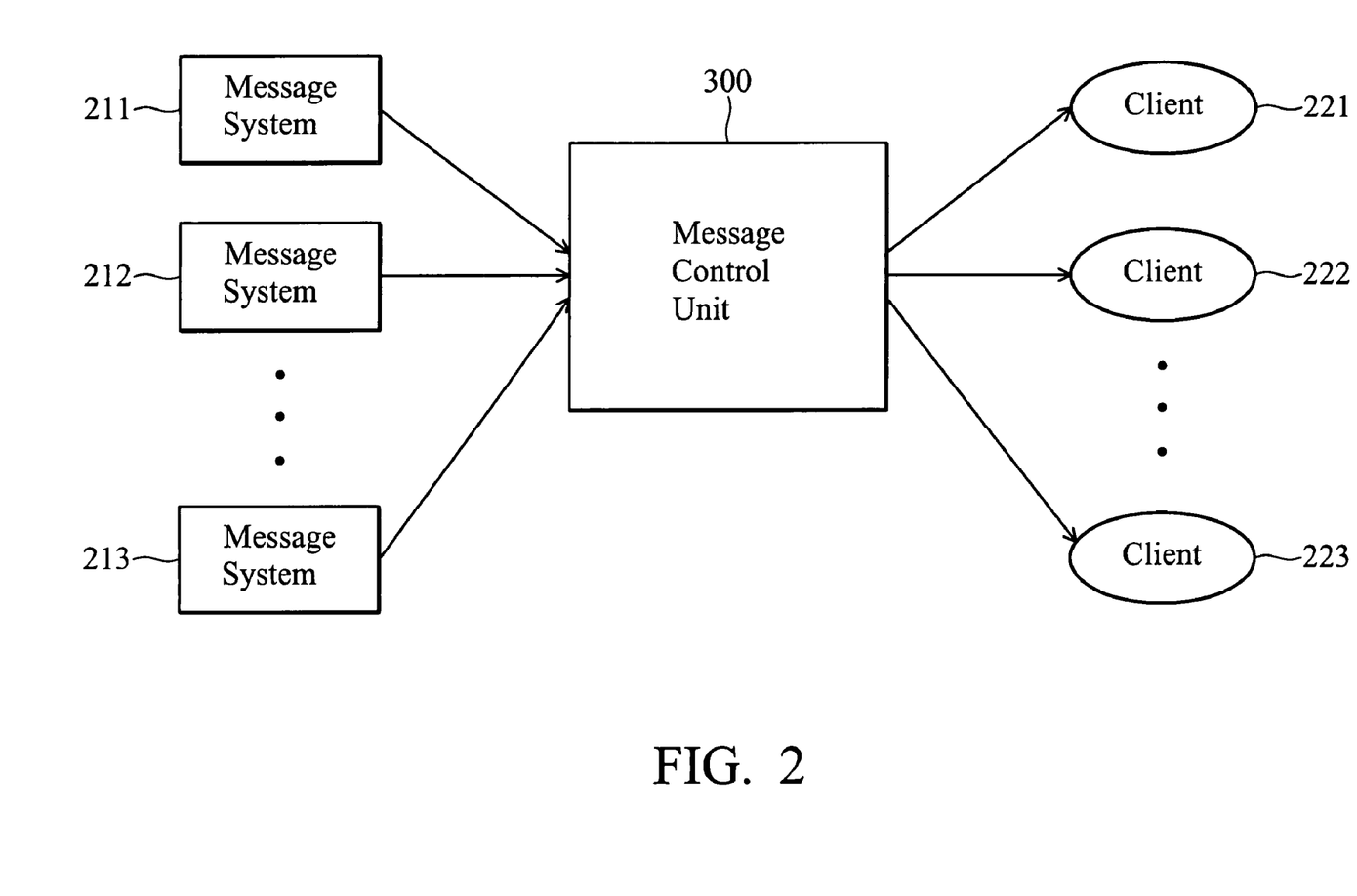
FIG. 2 is a schematic diagram illustrating the architecture of the message management system of an embodiment of the invention.

FIG. 2 is a schematic diagram illustrating the architecture of the message management system of an embodiment of the invention. The message management system includes a plurality of message systems (211, 212 and 213) and a message control unit 300. The message control unit 300 integrates the message systems (211, 212 and 213), and performs centralized message management and dispatch. The message control unit 300 maintains recipient lists for all the message systems (211, 212 and 213), and dispatches the messages to corresponding clients (221, 222 and 223).

Figure 3:
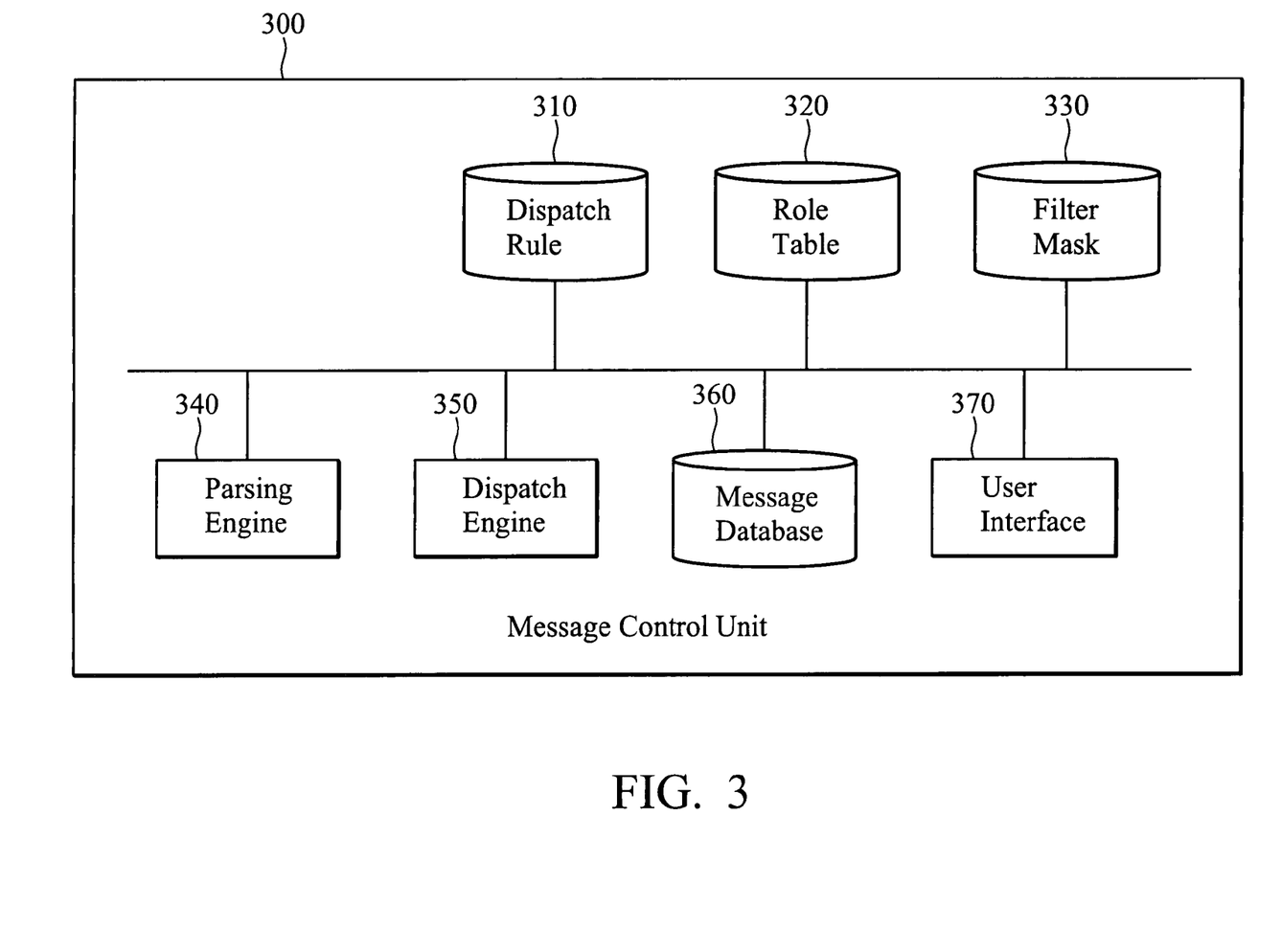
FIG. 3 is a schematic diagram illustrating a message control unit according to an embodiment of the invention.

FIG. 3 is a schematic diagram illustrating a message control unit according to an embodiment of the invention. The message control unit 300 includes a dispatch rule 310, a role table 320, filter masks 330, a parsing engine 340, a dispatch engine 350, a message database 360, and a user interface 370.

Figure 7:
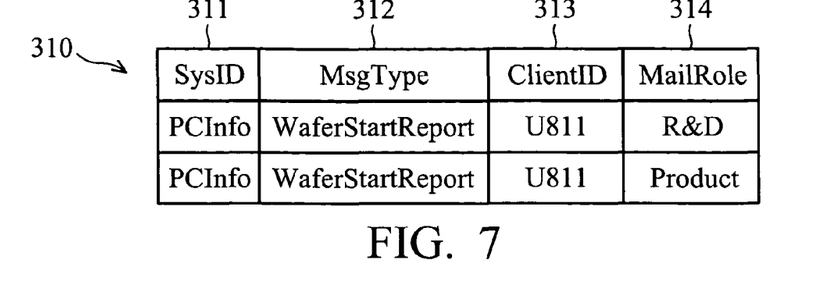
FIG. 7 shows an example of a dispatch rule.
Figure 8:
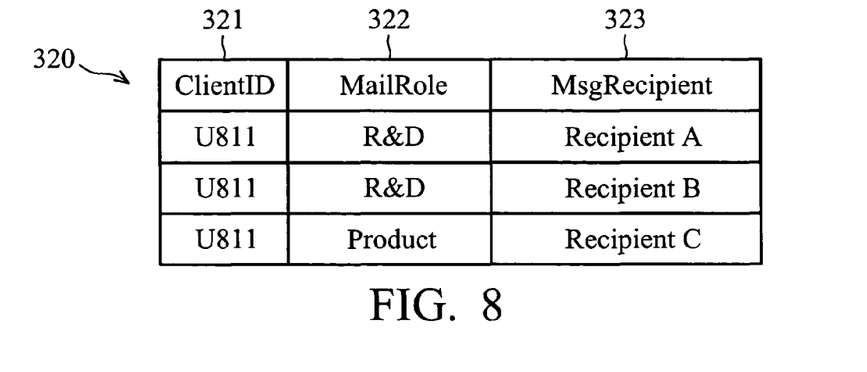
FIG. 8 shows an example of a role table.

The dispatch rule 310 defines system identification, message type, and corresponding client identification and mail role. The role table 320 defines the client identification, the mail role, and corresponding message recipient. FIG. 7 shows an example in which the dispatch rule 310 includes four columns of data fields as system identification "SysID", message type "MsgType", client identification "ClientID", and mail role "MailRole". FIG. 8 shows an example of a role table. The role table 320 includes three columns of data fields as client identification "ClientID", mail role "MailRole", and message recipient "MsgRecipient". The embodiment provides a subscription function for respective message recipients. Each message recipient may build and edit filter mask 330 to filter or forward some messages. Use of the dispatch rule 310, the role table 320, and the filter mask 330 are discussed later.

Figure 9:
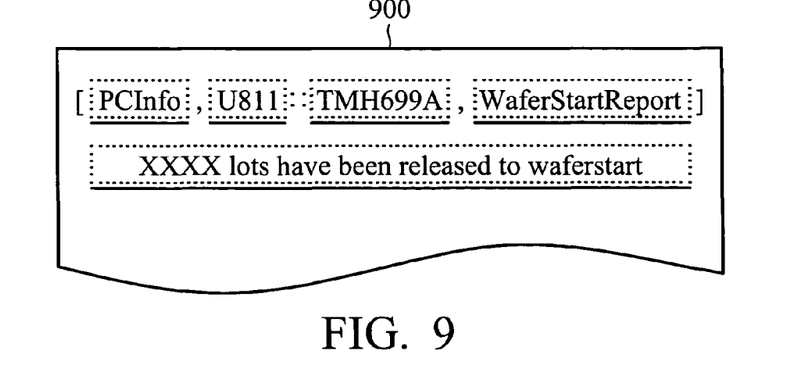
FIG. 9 shows a message example.

The parsing engine 340 parses respective message according to a predefined format to obtain the message content. The message content includes at least the system identification, the message type and the client identification. FIG. 9 shows a message example. After the message 900 is parsed, the message content including the system identification "PCInfo", client identification "U811", lot type "TMH699A", message type "WaferStartReport", and other message "XXXX lots have been released to waferstart" is obtained.

The dispatch engine 350 receives messages from the message systems (211, 212 and 213), and retrieves corresponding message recipients according to the dispatch rule 310, the role table 320, and the message content of the respective message. The dispatch engine 350 further filters or forwards the messages using the filter masks 330 corresponding to the message recipients, and transmits the messages to the message recipients if the messages conform to any filter mask 330. The filter mask 330 may be set as subscription of lot type is "TMH699A". In this case, the message 900 in FIG. 9 conforms to the filter mask 330, and can be transmitted to corresponding message recipient.

The message control unit 300 further classifies and stores the messages to the message database 360 according to message content, such as system identification, client identification, lot type, message type, and mail role. The user interface 370 can be provided for respective message recipients to query the messages according to corresponding client identification and mail role, with the query result is shown and browsable in the user interface 370. It is understood that embodiments of the present invention can be integrated with a web-based platform providing online service and displaying related information to clients.

Figure 4:
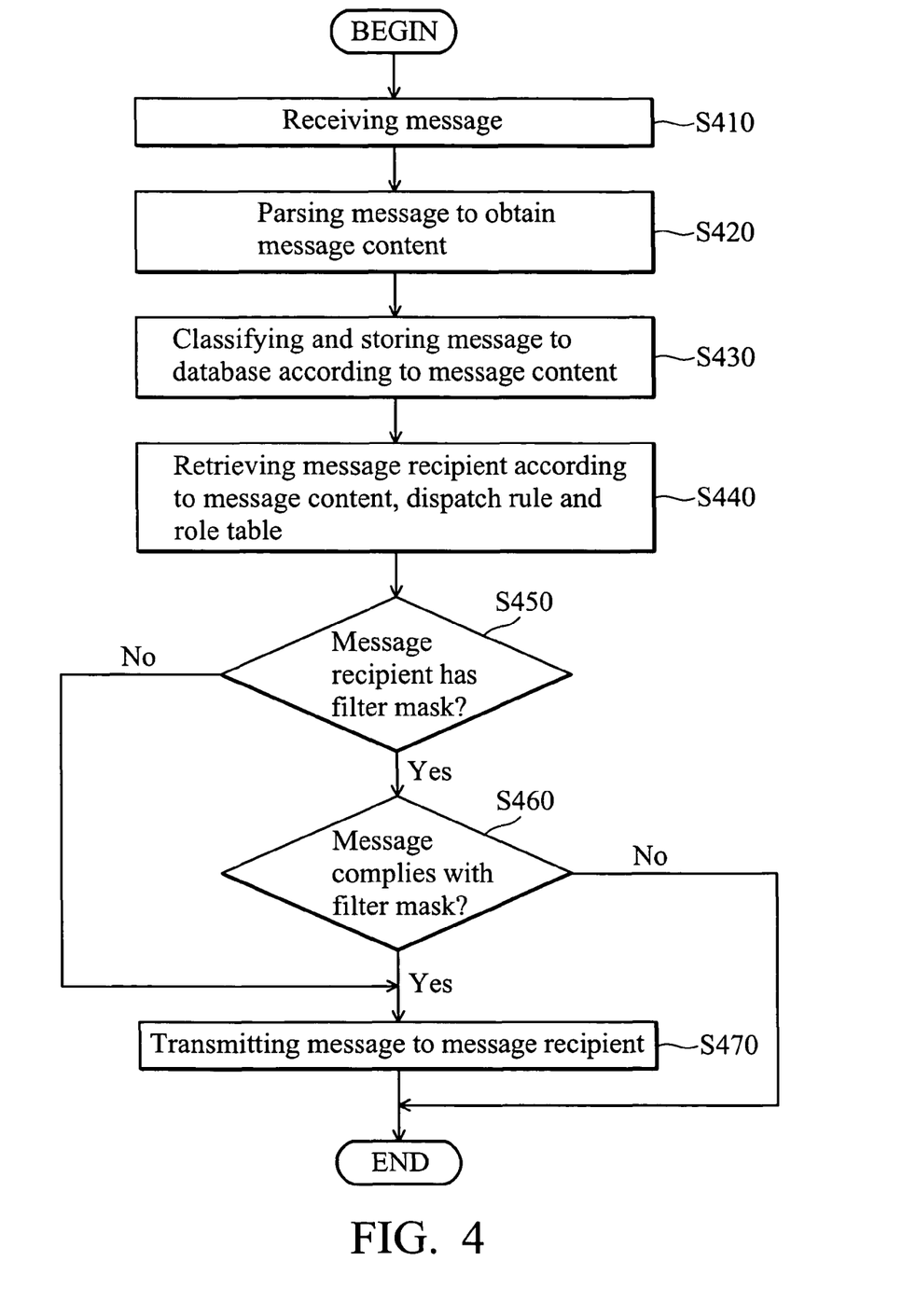
FIG. 4 is a flowchart showing the process of the message management method according to an embodiment of the invention.

FIG. 4 is a flowchart showing the process of the message management method according to an embodiment of the invention.

First, in step S410, at least one message is received. It is understood that multiple message sources can be integrated and sent for centralized management. In step S420, the message is parsed to obtain message content. The message content includes at least system identification, message type and client identification. Then, in step S430, the message is classified and stored according to the message content. The stored message is available to clients for further query.

In step S440, at least one recipient of the message is retrieved according to dispatch rule, role table, and message content. Thereafter, in step S450, it is determined whether the retrieved message recipient has a specific filter mask. If not, the procedure goes to step S470. If yes, in step S460, it is determined whether the message conforms to the filter mask. If not, the procedure is complete. If yes, in step S470, the message is transmitted to the message recipient. Referring to FIGS. 7, 8 and 9, the message 900 is transmitted to recipients A, B and C.

Figure 5:
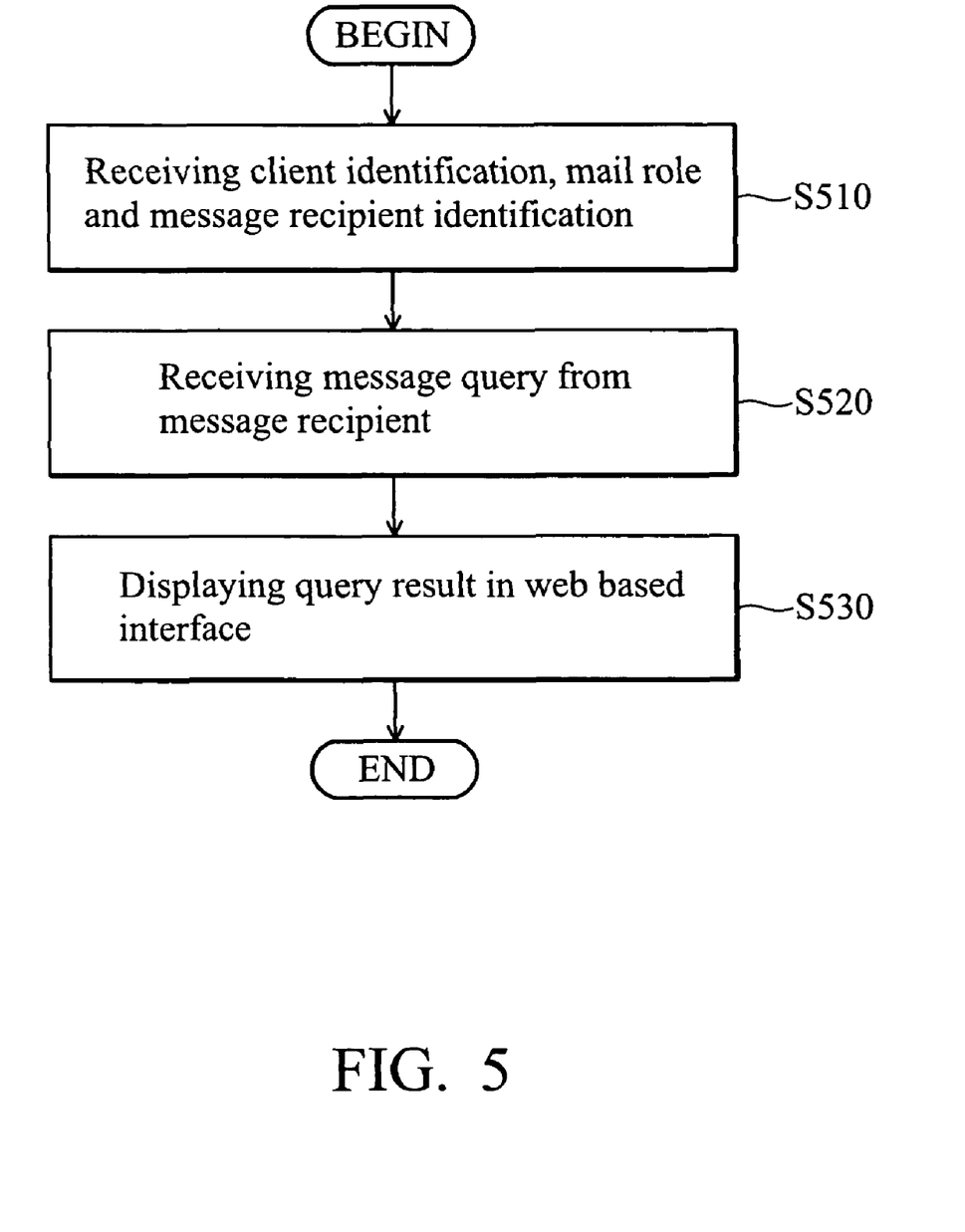
FIG. 5 is a flowchart showing the process of message query according to an embodiment of the invention.

FIG. 5 is a flowchart showing the process of message query according to an embodiment of the invention. First, in step S510, the client identification, mail role and message recipient identification are received via the user interface. Then, in step S520, a message query is received from the recipient. Thereafter, in step S530, the query result is shown and browsable in the web-based user interface.

Figure 6:
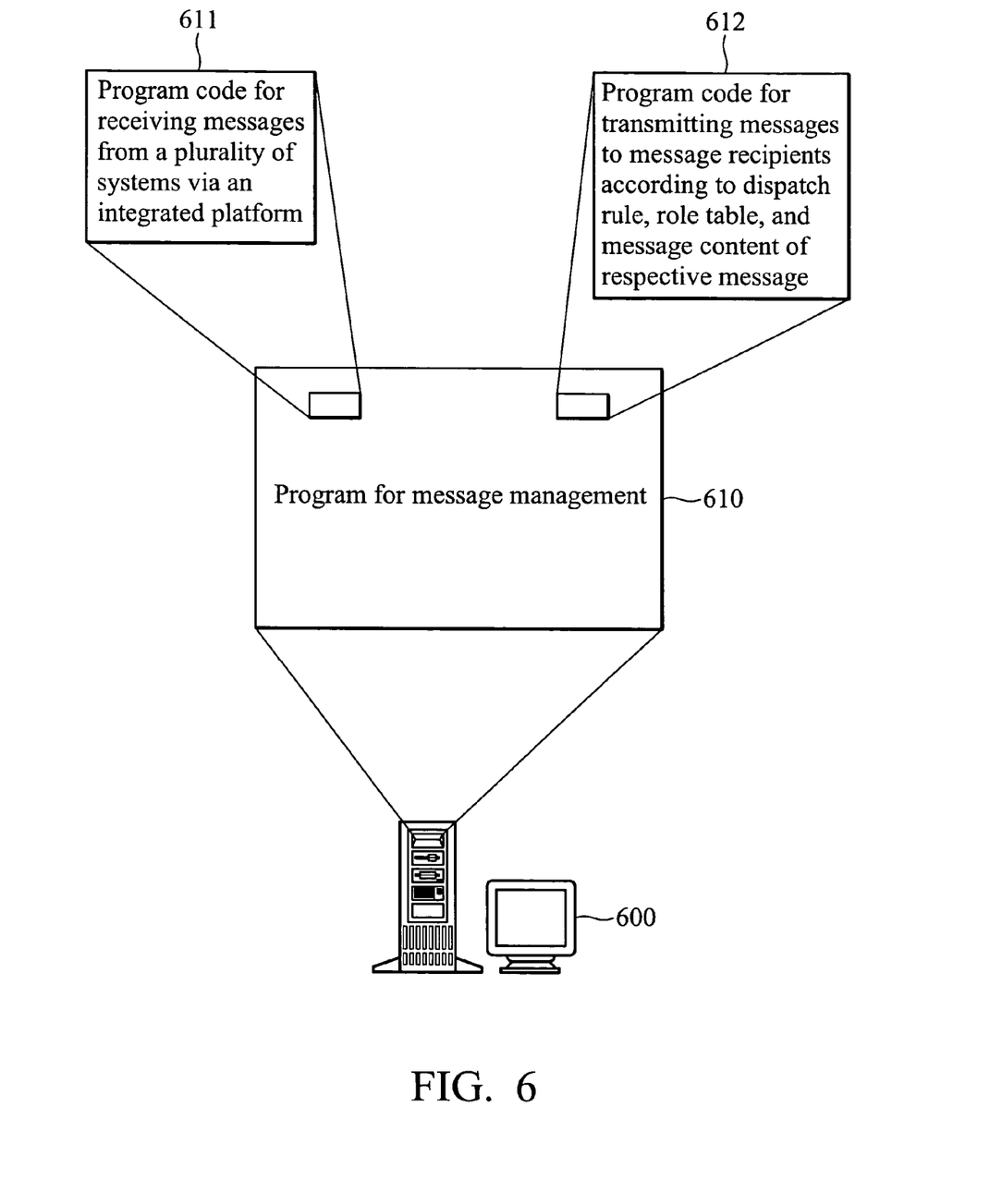
FIG. 6 is a schematic diagram illustrating a storage medium storing a computer program for execution of the message management method according to an embodiment of the present invention.

FIG. 6 is a diagram of a storage medium storing a computer program providing the message management method according to an embodiment of the present invention. The computer program product comprises a storage medium 610 having computer readable program code embodied therein for use in a computer system 600. The computer readable program code comprises at least computer readable program code 611 receiving a plurality of messages from a plurality of systems via an integrated platform, and computer readable program code 612 transmitting the messages to corresponding recipients according to a dispatch rule, a role table, and content of the respective message, in which the dispatch rule defines system identification, message type, and corresponding client identification and mail role, and the role table defines client identification, mail role, and corresponding recipient.

The program further comprises computer readable program code (not shown) parsing respective messages to obtain the message content, in which the message content comprises at least system identification, message type and client identification, computer readable program code (not shown) classifying and storing the messages in a message database according to the content of the respective message, and displaying a query result for the messages based on corresponding client identification and mail role of the recipient in the web-based interface, and computer readable program code (not shown) filtering the messages using at least one filter mask per recipient, and transmitting the messages to the recipient if the messages comply with the filter mask.

An embodiment of the invention thus provides a manufacturing management system and method that integrates multiple message systems, and performs centralized message management and dispatch. Embodiments of the invention can provide integration of multiple message sources by sending all messages to a centralized control unit, and dispatching the messages therefrom, simplification of client email address management by defining mail roles as message recipients rather than of individual email addresses, and strengthened message management by storing all old messages in a classified database, allowing query or browsing, and providing subscription adjustment for individual clients, and may thereby improve accuracy of message transmission, reduce duplicated system resource investment, and save manpower and time for system maintenance.

Embodiments of the method and system, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. The method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed embodiment. When implemented on a general-purpose processor, the program code combines with the processor to provide a unique apparatus that operates analogously to application specific logic circuits.

Although an embodiment of the present invention has been described, it is not intended to limit the invention thereto. Those skilled in this technology can still make various alterations and modifications without departing from the scope and spirit disclosed.

What is claimed is:

1. A wafer lot production line with a message management system, comprising:
   a message control unit comprising:
      a dispatch rule defining a system identification, a message type, and corresponding client identification and mail role, wherein when a message is transmitted to a mail role, recipients defined by the mail role and the client identification are respectively transmitted with the message;
      a role table defining the client identification, the mail role, and at least one corresponding recipient, wherein the combination of the client identification and the mail role defines a group of recipients;
   at least one filter mask having a subscription function whereby each of the recipients can edit the at least one filter mask to forward some messages; and
      a processor executing a dispatch engine and a parsing engine to receive at least one message from one of a plurality of systems, parse the message to obtain message content comprising at least a defined system identification, a defined message type, a lot type in the production line and a defined client identification, a defined message type and a defined client identification, correspond to a defined mail role based on the defined system identification, the defined message type and the defined client identification using the dispatch rule, and retrieve a plurality of defined recipients based on the defined client identification and the defined mail role using the role table, wherein the defined recipients are defined by the defined client identification and the defined mail role in the role table, filtering the message according to the filter mask, and respectively transmit the message to the defined recipients if the message complies with the filter mask.

2. The system of claim 1 wherein the message control unit further classifies and stores the messages in a message database according to content.

3. The system of claim 2 wherein the message control unit further comprises a user interface for recipients to query the messages according to corresponding client identification and mail role.

4. The system of claim 3 wherein the user interface comprises a web-based interface, the query result viewable and browsable therein.

5. The system of claim 1 wherein the message control unit further comprises a user interface for respective recipients to modify dispatch rule or role table.

6. The system of claim 1 wherein the message control unit further comprises a user interface for message recipients to modify the filter mask.

7. A wafer lot production line with a computer-implemented message management method for use in a computer, wherein the computer is programmed to perform the steps of:
   receiving at least one message from one of a plurality of systems by the computer;
   parsing the message by the computer to obtain message content comprising at least a defined system identification, a defined message type, a lot type in the production line and a defined client identification;
   corresponding to a defined mail role based on the defined system identification, the defined message type and the defined client identification using a dispatch rule by the computer, wherein the dispatch rule defines a system identification, a message type, and corresponding client identification and mail role, wherein when a message is transmitted to a mail role, recipients defined by the mail role and the client identification are respectively transmitted with the message;
   retrieving a plurality of defined recipients based on the defined client identification and the defined mail role using a role table by the computer, wherein the role table defines the client identification, the mail role, and at least one corresponding recipient, the combination of the client identification and the mail role defines a group of recipients, and the defined recipients are defined by the defined client identification and the defined mail role in the role table;
   filtering the message according to at least one filter mask having a subscription function whereby each of the recipients can edit the at least one filter mask to forward some messages; and
   respectively transmitting the message to the defined recipients if the message complies with the filter mask by the computer.

8. The method of claim 7 further comprising classifying and storing the messages in a message database according to content.

9. The method of claim 8 further comprising querying the messages according to corresponding client identification and mail role of respective recipients via a user interface.

10. The method of claim 9 wherein the user interface comprises a web-based interface, further comprising display and browsing of query results therein.

11. The method of claim 7 further comprising modification of the dispatch rule or role table by respective recipients via a user interface.

12. The method of claim 7 further comprising modification of the filter mask by respective recipients via a user interface.

13. A wafer lot production line with a non-transitory machine-readable storage medium storing a computer program, causing when executed a computer to perform a message management method, comprising:
   receiving at least one message from one of a plurality of systems by the computer;

parsing the message by the computer to obtain message content comprising at least a defined system identification, a defined message type, a lot type in the production line and a defined client identification;

corresponding to a defined mail role based on the defined system identification, the defined message type and the defined client identification using a dispatch rule by the computer, wherein the dispatch rule defines a system identification, a message type, and corresponding client identification and mail role, wherein when a message is transmitted to a mail role, recipients defined by the mail role and the client identification are respectively transmitted with the message;

retrieving a plurality of defined recipients based on the defined client identification
and the defined mail role using a role table by the computer, wherein the
role table defines the client identification, the mail role, and at least one corresponding recipient, the combination of the client identification and the mail role defines a group of recipients, and the defined recipients are defined by the defined client identification and the defined mail role in the role table;

filtering the message according to at least one filter mask having a subscription function whereby each of the recipients can edit the at least one filter mask to forward some messages for the respective recipients; and respectively transmitting the message to the defined recipients if the message complies with the filter mask by the computer.

14. The storage medium of claim 13, the method further comprising classifying and storing the messages in a message database according to content of respective message, and displaying a query result of the messages based on corresponding client identification and mail role of respective recipients in the web-based interface.

* * * * *